United States Patent [19]

Kroger et al.

[11] 3,979,223
[45] Sept. 7, 1976

[54] ELECTROCHEMICAL IMPREGNATION OF ELECTRODE FOR RECHARGEABLE CELL

[75] Inventors: Hanns H. Kroger, Gainesville; Stuart F. Acree, Archer; Allen P. Akridge, Gainesville, all of Fla.

[73] Assignee: General Electric Company, Columbus, Ohio

[22] Filed: Mar. 30, 1973

[21] Appl. No.: 346,633

Related U.S. Application Data

[63] Continuation of Ser. No. 120,504, March 3, 1971, abandoned.

[52] U.S. Cl. ............................. 204/24; 204/43 T; 204/96; 204/293; 429/245
[51] Int. Cl.² ........................................ H01M 4/22
[58] Field of Search ....................... 136/76, 25, 29; 204/228, 96, 242, 295, 296, 43 T, 293

[56] References Cited
UNITED STATES PATENTS

| 880,957 | 3/1908 | Aylsworth | 136/28 |
| 914,343 | 3/1909 | Edison | 136/28 |
| 3,282,825 | 11/1966 | Brown et al. | 204/295 |
| 3,414,494 | 12/1968 | Cuenot | 204/96 |
| 3,443,996 | 5/1969 | Folk et al. | 136/76 |
| 3,467,586 | 9/1969 | Grotheer et al. | 204/295 |
| 3,492,544 | 1/1970 | Falanga | 204/228 X |
| 3,507,699 | 4/1970 | Pell et al. | 136/76 |
| 3,558,454 | 1/1971 | Schafer | 204/228 X |
| 3,591,483 | 7/1971 | Loftfield et al. | 204/252 |
| 3,600,227 | 8/1971 | Hardman | 136/76 |

*Primary Examiner*—G. L. Kaplan
*Assistant Examiner*—C. F. Lefevour
*Attorney, Agent, or Firm*—D. A. Dearing; D. J. Voss; F. H. Neuhouser

[57] ABSTRACT

An improved system for electrochemical impregnation of active material into an electrode for a galvanic cell comprises utilizing a constant potential during the impregnation as well as a screen or barrier interposed, in the bath, around the electrode while it is impregnated to mitigate the deposition of active material on the outside of the electrode surfaces. A more densely packed electrode having a higher charge rating per unit volume results. In a preferred embodiment the active material comprises a minor amount of a second ion and the ratio of the two ions in the bath is maintained by use of a consumable electrode in the bath having the desired ratio of ions therein.

2 Claims, 1 Drawing Figure

INVENTORS:
HANNS H. KROGER,
STUART F. ACREE,
ALLEN P. AKRIDGE,

BY *John P. Taylor*

THEIR ATTORNEY.

ELECTROCHEMICAL IMPREGNATION OF ELECTRODE FOR RECHARGEABLE CELL

This is a continuation, of application Ser. No. 120,504, filed Mar. 3, 1971 now abandoned.

BACKGROUND OF THE INVENTION

Electrochemical deposition of active material into the pores or interstices of a foraminous electrode support is an alternate to chemical or mechanical deposition of such material and, at least in some instances, may be preferred. For example, in the formation of the positive (nickel) electrode for a nickel-cadmium cell, the nickel is applied to the electrode as a nitrate and then, after impregnation, converted to the desired hydroxide by treatment with caustic. The resultant electrode is not too densely packed resulting in a charge to volume ratio which is lower than desirable for a high capacity cell of minimum volume.

Electrodeposition of the nickel material using the conventional constant current deposition techniques common to the art results in the direct formation, in the electrode, of a hydrated form of nickel-hydroxide which is then dehydrated by treatment with caustic.

This technique has not met with wide spread acceptance, however. One of its drawbacks is the formation or deposition of undesirable surface depositions which add to the overall weight of the electrode, impede further internal deposition, and lastly interfere with subsequent use of the electrode in a cell by flaking off and shorting the cell as the material is converted from its reduced form to its oxidized form.

The use of additives such as, for example, cobalt, in the active material of the electrode to inhibit fading of the electrode is also well known. However, maintaining the correct ratio of cobalt to nickel in an electrochemical impregnation, unlike a batch process, present additional difficulties.

SUMMARY OF THE INVENTION

It is therefore an object of this invention to provide an improved electrochemical impregnation system for the construction of an electrode for a galvanic cell.

It is another object of the invention to provide improved means for electrochemically impregnating electrodes for galvanic cells while inhibiting surface deposition of the active material on the exterior of the electrodes.

It is a further object of the invention to provide means for electrochemically impregnating an electrode for a rechargeable cell with active material having a relatively constant amount of at least one additive.

These and other objects of the invention will be apparent from the drawings and the specification.

DESCRIPTION OF THE PREFERRED EMBODIMENT

In accordance with the invention, electrodes are produced by electrochemical deposition of active materials into the pores of a foraminous electrode support. The electrode support material useful in the practice of the invention includes any conventional porous material or plaque such as is well known in the art.

Figure 1:
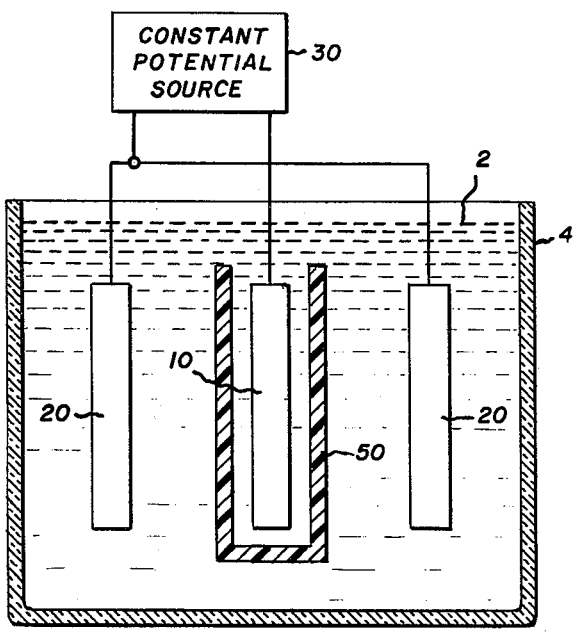
FIG. 1 is a schematic sketch illustrating the invention.
Figure 2:
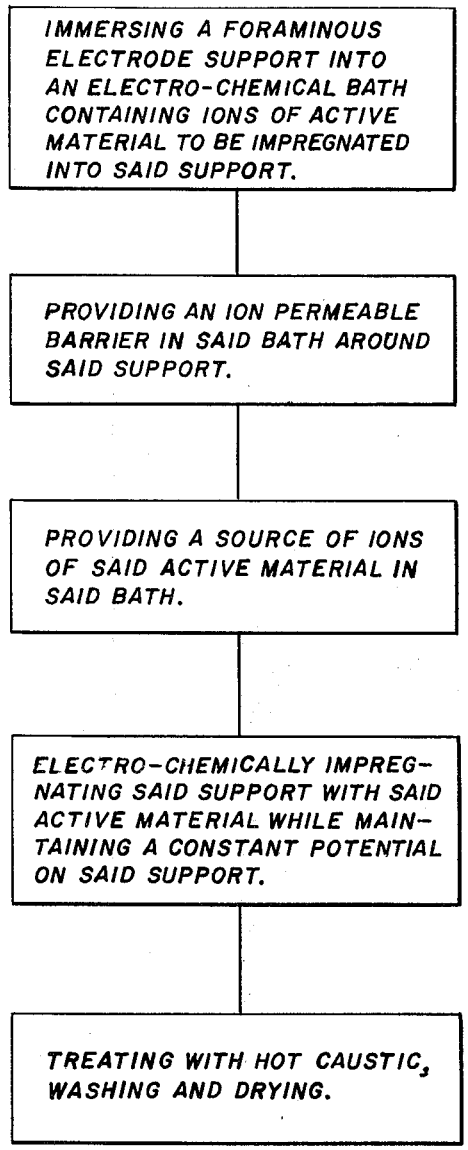
FIG. 2 is a flow sheet of the invention.

The electrode support 10 as illustrated at 10 in FIG. 1 is placed in an electrochemical bath 2 comprising a container 4 having a solution therein of the active material to be deposited within the pores of support 10. In the formation of positive electrodes for nickel-cadmium cells, an aqueous solution of about 4 molar $Ni(NO_3)_2$ is used.

In a preferred embodiment $Co(NO_3)_2$ is also present in the solution in a weight ratio of 10 parts by weight $Co(NO_3)_2$ per 90 parts by weight $Ni(NO_3)_2$. In accordance with the invention, the concentration and ratios of the nickel ions and cobalt ions in the solution are maintained using consumable electrodes 20 on each side of support 10 comprising a nickel-cobalt alloy of about 90 percent by weight nickel and 10 percent by weight cobalt. The nickel and cobalt are deposited within the pores of support 10 as hydroxides. As the nickel and cobalt ions are deposited within electrode 10, the concentration is maintained by the dissolving of like numbers of nickel and cobalt ions at electrodes 20 thereby causing the concentration of metal ions in the bath to remain relatively constant. The use of a nickel-cobalt alloy as consumable electrodes 20 not only assures a constant supply of ions to replace those deposited in support 10, but it insures maintenance of the desired ratio of nickel to cobalt ions in the bath.

In accordance with the invention, a source of constant potential 30 of between about 1.5 to 3.0 volts, D.C. preferably about 2.5–3.0 volts is applied between electrode 10 and electrodes 20, electrode 10 being connected to the negative terminal of constant potential source 30. The deposition is carried out in cycles for a time period of about 10–30 minutes each, preferably about 30 minutes.

After each cycle, electrode 10 is removed from the bath and immersed in caustic for about 30–60 minutes to dehydrate the hydroxide active material. In a preferred embodiment, the electrode is immersed in hot caustic comprising KOH of about 20–40% by weight at a temperature of about 50–90°C.

The electrode is thoroughly washed in distilled water, preferably hot, to remove all traces of the caustic and then dried. Preferably, the drying is carried out at an elevated temperature of, for example, about 60–120°C for about 10–30 minutes. Any deposit of active material on the external surface of the electrode is then removed and the cycle repeated. Preferably about 5–15 such cycles are made.

Alternatively, the deposition period can be lengthened and the number of cycles reduced. However, it has been found that a plurality of cycles of shorter duration of about 30 minutes yield a more densely packed electrode structure having therefor higher charge per unit volume.

In accordance with a preferred embodiment of the invention, a perforated barrier of non-conducting material 50 is placed in bath 2 around electrode 10. For example, a perforated and corrugated sheet of polyvinylchloride can be used to form barrier 50. The use of such a barrier has been found to not only assist in reduction of external deposition or scaling on the surface of electrode 10 but to also, for an unexplained reason, change the nature of any scale formed to become very brittle and easily removable upon subsequent drying of the electrode. Other non-conducting materials, for example, materials commonly used as separators between plates can be used as well. The size of the openings can vary considerably from a minimum which should be great enough to allow ionic penetration therethrough to a maximum total opening area of about 50–60% of total area of the barrier material.

To further illustrate the invention a number of electrodes were electrochemically impregnated using respectively the constant current technique of the prior art and constant potential in accordance with the invention. The electrodes were 0.083 cm thick and consisted of 20 × 20 nickel mesh wire (of 0.007 inch diameter) screen as substrate with a porous nickel sinter structure having a calculated overall porosity of 82% inclusive of the substrate and having a total area of 50 cm$^2$. The bath used in the formation of each electrode included a 4 molar concentration of $Ni(NO_3)_2$ and sufficient $Co(NO_3)_2$ to provide a 9:1 weight ratio of nickel to cobalt. After impregnation the electrodes were treated for 30 minutes in 80°C KOH of 31% by weight strength. The electrodes were washed in hot deionized water for 30 minutes and then dried at 105°C in a forced air oven for 30 minutes.

the amount of active material impregnated within the electrode and in the percentage of the total weight gain which represents the internal weight gain. Obviously, a low percentage means that a high amount of the total weight gain represents an undesirable external deposition which is not useful and must be laboriously removed before the electrode can be used.

Accordingly, the data must be analyzed with both of these factors in mind. The constant potential process using voltages ranging from 2.5 to 3.0 volts appear to give the highest loadings together with maximum internal deposition.

Electrodes E, G, H, I, J, N, S, T, U, and V (marked with an asterisk) were, in accordance with the invention, shielded with a barrier material as previously described. An examination of the external depositions on these electrodes indicated that the external material was more brittle and more easily removed than were the external depositions on the other electrodes which did not have such a barrier. While the exact reason is not known it is theorized that the throwing power of the bath may be changed by the presence of the barrier layer to give a more uniform distribution within the bath.

TABLE I

ELECTRODES IMPREGNATED UNDER CONSTANT CURRENT CONDITIONS

| Electrode | Step I<br>70 minutes at<br>50 milliamps<br>per cm$^2$<br>Ah/in$^3$ | Step II<br>60 minutes at<br>30 milliamps<br>per cm$^2$<br>Ah/in$^3$ | Step III<br>70 minutes at<br>15 milliamps<br>per cm$^2$<br>Ah/in$^3$ | Internal % of<br>Total Weight Gain |
|---|---|---|---|---|
| A | 4.1 | 5.5 | 5.6 | 62 |
| B | 4.0 | 5.5 | 6.5 | 55 |
| C | 4.1 | 5.6 | 6.6 | 65 |

TABLE II

ELECTRODES IMPREGNATED UNDER CONSTANT POTENTIAL CONDITIONS

| Electrode | Voltage | Cycles | Time per Cycle (minutes) | Ah/in$^3$ | Internal % of Total Weight Gain |
|---|---|---|---|---|---|
| D | 1.5 | 13 | 30 | 7.4 | 91 |
| E* | 1.5 | 1 | 942 | 3.7 | 99 |
| F | 2.0 | 14 | 30 | 7.8 | 95 |
| G* | 2.0 | 1 | 942 | 4.3 | 74 |
| H* | 2.0 | 1 | 300 | | |
| | 2.5 | 5 | 30 | 8.4 | 94 |
| I* | 2.25 | 1 | 1440 | 4.9 | 36 |
| J* | | 1 | 942 | | |
| | 2.25 | 1 | 972 | 6.7 | 81 |
| K | 2.25 | 1 | 300 | | |
| | 2.5 | 3 | 30 | 7.0 | 77 |
| L | 2.5 | 12 | 10 | 6.4 | 91 |
| M | 2.5 | 11 | 20 | 7.4 | 91 |
| N* | 2.5 | 6 | 30 | 7.8 | 95 |
| O | 2.5 | 7 | 30 | 7.9 | 96 |
| P | 2.5 | 5 | 30 | 7.0 | 85 |
| Q | 2.75 | 6 | 30 | 8.2 | 78 |
| R | 3.0 | 6 | 30 | 7.7 | 69 |
| S* | 3.0 | 1 | 30 | | |
| | 2.5 | 4 | 30 | 8.3 | 80 |
| T* | 3.0 | 1 | 10 | | |
| | 2.75 | 1 | 30 | | |
| | 2.5 | 3 | 30 | 6.8 | 90 |
| U* | 3.0 | 1 | 20 | | |
| | 2.75 | 1 | 20 | | |
| | 2.5 | 4 | 30 | 8.3 | 94 |
| V* | 3.0 | 1 | 30 | | |
| | 2.75 | 1 | 30 | | |
| | 2.5 | 4 | 30 | 8.9 | 84 |

The results illustrate the differences in the two processes both in the total capacity of the impregnated electrode in ampere-hours per cubic inch representing While the exact reasons are not known as to why the constant potential process of the invention yields superior results to the prior art constant current process, it is thought that external deposition may be favored over internal deposition once a threshold or critical voltage has been reached. Using the prior art constant current process the voltage increases with time in order to maintain the current constant. This may be the cause of the undesirable external scaling. It is not the intention, however, to be bound by any particular theories of operation.

While the invention has been described with regard to particular electrode materials at particular voltages, it should be understood that these are only illustrative. Minor modifications from the foregoing will be obvious to those skilled in the art and should be deemed to be within the scope of the invention as defined in the appended claims.

We claim:

1. A process for preparing by electrodeposition electrodes for use as positive electrodes for nickel-cadmium, alkaline electrolyte, rechargeable cells, said process comprising the steps of:

a. immersing a porous metallic support in an acidic electrolyte bath comprising solutions of nickel nitrate and cobalt nitrate in predetermined weight proportion to provide a weight ratio of nickel to cobalt of about 9:1;

b. maintaining, with the use of at least one consumable electrode comprised of a nickel-cobalt alloy, the weight ratio of nickel to cobalt substantially constant by supplying ions of nickel and cobalt in said bath in substantially the same weight-ratio; and c. applying a constant electric potential between said metallic support and said at least one consumable electrode to deposit the hydroxides of nickel and cobalt in the pores of said metallic support in substantially the same weight ratio.

2. The method of claim 1 wherein said source of ions comprises consumable electrodes within said bath and said source of constant potential is connected between said consumable electrode and said support.

* * * * *